United States Patent
Bedford et al.

(10) Patent No.: US 7,389,232 B1
(45) Date of Patent: Jun. 17, 2008

(54) COMMUNICATION DEVICE AND LEARNING TOOL

(75) Inventors: Jeanne Bedford, 132 Virginia Ave., Elyria, OH (US) 44035; Suzanne Hasko, Elyria, OH (US)

(73) Assignee: Jeanne Bedford, Elyria, OH (US)

( * ) Notice: Subject to any disclaimer, the term of this patent is extended or adjusted under 35 U.S.C. 154(b) by 829 days.

(21) Appl. No.: 10/609,118

(22) Filed: Jun. 27, 2003

(51) Int. Cl.
*G09B 21/00* (2006.01)
(52) U.S. Cl. .................. 704/270; 434/112; 345/168
(58) Field of Classification Search ........ 704/270–278; 434/112–117; D14/320, 315
See application file for complete search history.

(56) References Cited

U.S. PATENT DOCUMENTS

| | | | | | |
|---|---|---|---|---|---|
| 4,884,972 | A | * | 12/1989 | Gasper ................. | 434/185 |
| 4,939,514 | A | * | 7/1990 | Miyazaki ............... | 341/22 |
| 5,097,425 | A | * | 3/1992 | Baker et al. .......... | 704/260 |
| 5,278,779 | A | * | 1/1994 | Conway et al. ........ | 361/680 |
| 6,151,012 | A | * | 11/2000 | Bullister .............. | 345/168 |
| 7,146,577 | B2 | * | 12/2006 | Hoffman .............. | 715/865 |

OTHER PUBLICATIONS

Website print-out of Augmentative Communication Consultants, Inc. (http://www.acciinc.com); "Helping you make the right choices"; Jun. 4, 2003 (3 pages).
Website print-out of Attainment Family.com (http://www.attainment.com); "Browsing Language & Communication;" Jun. 4, 2003; (1 page).
Website print-out of Digital Acoustic Corporation (http://www.textspeak.com/talktype.htm); Jun. 4, 2003; "TextSpeak TS Series"; Jun. 4, 2003 (1 page).
Website print-out of EnableMart (http://www.enablemart.com/products); "EnableMart Technology for Everyone: Product: Intellikeys Classic"; Jun. 4, 2003 (2 pages).
Website print-out of Mayer-Johnson, Inc. (http://www.mayerjohnson.com/software/boardmkr.html); "Boardmaker TM"; Jun. 4, 2003 (9 pages).
Website print-out of Prentke Romich Company (http://www.prentrom.com); "PRC's Augmentative Communication Products: Pathfinder, Vanguard, Vantage, Springboard"; Jun. 4, 2003 (5 pages).
Website print-out of Words+ (http://www.words-plus.com/website/products/syst); "Words+: Products: Communication Systems; Freedom 2000 Extreme Toughbook"; Jun. 4, 2003 (3 pages).
Website Print-out of Prentke Romich Copmany (http://store.prentrom.com/catalog/prentrom/) "Springboard-Overview"; Jun. 4, 2003 (1 page).
Website print-out of Zygo Industries, Inc. (http://www.zygo-usa.com/opt2.html) "Zygo-Optimist III-An Augmentative Communication Personal Pen Computer"; Jun. 20, 2003 (2 pages).

(Continued)

*Primary Examiner*—Abul K. Azad
(74) *Attorney, Agent, or Firm*—Curatolo Sidoti Co. LPA; Salvatore A. Sidoti; Peter R. Detome (57) ABSTRACT

A portable communication device and learning tool for use by speech impaired individuals or monolinguistic individuals is provided by the present invention. The device is foldable for convenient carrying and storage. A method of using the communication device and learning tool is also provided.

36 Claims, 8 Drawing Sheets

OTHER PUBLICATIONS

Website print-out of Zygo Industries, Inc. (http://www.zygo-usa.com/slsum.htm) "Zygo-Overview of LightWRITRES: For People With Progressive Conditions, i.e. ALS/MND"; Jun. 20, 2003 (6 pages).

Website print-out of Zygo Industries, Inc. (http://www.zygo-usa.com/lighwrts.htm); Zygo-LightWRITER-A Dedicated Augmentative Communication/Conversation aid; Jun. 20, 2003 (3 pages).

Website print-out of Zygo Industries, Inc. (http://www.zygo-usa.com/sl35big.htm); "LightWriter SL35/Big Keys" Jun. 20, 2003 (2 pages).

Website print-out of Zygo Industries, Inc. (http://www.zygo-usa.com/sl35c.htm); "LightWRITER SL35/C A LightWRITER for those who need a full-sized keyboard" Jun. 20, 2003 (2 pages).

Website print-out of Zygo Industries, Inc. (http://www.zygo-usa.com/slcansls.htm); "Scannin LightWRITERs: For those who cannot use a keyboard" Jun. 20, 2003 (3 pages).

Website print-out of Zygo Industries, Inc. (http://www.zygo-usa.com/polyana.htm); "Polyana II with Persona: For writing and talking-a lot!" Jun. 20, 2003 (2 pages).

Website print-out of Words+ (http://www.words-plus.com/website/products/syst/f2k extreme tb.htm); "Words+: Products: Communication Systems; Freedom 2000 Extreme Toughbook-Go Wireless!"; Jun. 20, 2003 (4 pages).

Website print-out of Words+ (http://www.words-plus.com/website/contact.htm); "How to contact us"; Jun. 20, 2003 (1 page).

Website print-out of Mayer-Johnson, Inc. (http://www.mayerjohnson.com/hardware/Alphasmt.html); "Alphasmart 3000 Keyboard"; Jun. 20, 2003 (3 pages).

Website print-out of Mayer-Johnson, Inc. (http://www.mayerjohnson.com/hardware/Intelkey.html); "Intellikeys"; Jun. 20, 2003 (3 pages).

Website print-out of Mayer-Johnson, Inc. (http://www.mayerjohnson.com/hardware/Partdevs.html): "Partner Series"; Jun. 20, 2003 (2 pages).

Website print-out of Mayer-Johnson, Inc. (http://www.mayerjohnson.com/hardware/CqatPC.html); "ChatPC-II"; Jun. 20, 2003 (3 pages).

Website print-out of Mayer-Johnson, Inc. (http://www.mayerjohnson.com/hardware/Gotalk.html); "GoTalk Series"; Jun. 20, 2003 (2 pages).

Website print-out of Mayer-Johnson, Inc. (http://www.mayerjohnson.com/hardware/Hhv.html); "Hand Held Voice. For the person on the go!"; Jun. 20, 2003 (4 pages).

Website print-out of Mayer-Johnson, Inc. (http://www.mayerjohnson.com/hardware/Link.html); "Link"; Jun. 20, 2003 (2 pages).

Website print-out of Mayer-Johnson, Inc. (http://www.mayerjohnson.com/hardware/Techdevs.html); "Tech/Talk, Tech/Speak, Tech/Four, Tech/Scan & Talk/Scan"; Jun. 20, 2003 (4 pages).

Website print-out of Interactive Therapeutics, Inc. (http://www.interactivetherapy.com/Merchant/Ncomunctr.ihtml); "The Communicators. Hospital, Facility, Home Health and Community Use"; Jun. 20, 2003 (5 pages).

Laureate Learning Systems. "Special Needs Software-Spring 2002 Catalog" Spring, 2002; (4 pages).

Interactive Therapeutics, Inc. Product Catalog; "Communicating in the Real World 2003-The Critical Communicator, VisiBoard, Daily Communicator, Picture Communicator and Intermerdiate Size Communicators"; 2003 (5 pages).

Zygo Industries, Inc. 25th Anniversary Product Catalog; "Optimist, Winspeak, HandsOFF!, DACTYL MACAW, MACAW, MACAW II, LightWRITER SL35/C"; 1998 (10 pages).

Prentke Romich Company. "2002 Guide to Augmentative Communications Products & Support Services from PRC"; 2002 (9 pages).

Prentke Romich Company. Product Information Sheet-"Vantage"; Dec. 3, 2002; (4 pages).

Prentke Romich Company. Product Information Sheet-"SpringBoard"; Dec. 3, 2002; (4 pages).

Dynavox Systems Product Catalog for "Dynawrite, Dynavox 3100, Dynamyte 3100 and Dynamo products"; (12 pages).

Dynavox Systems Product Information Sheet "Dynavox 3100 & Dynamyte 3100 with DSS-Augmentative Communication Devices"; (4 pages).

Dynavox Systems Product Information Sheet "DYNAwrite-The Ultimate Conversation Piece"; (4 pages).

Dynavox Systems Product Information Sheets "Dynamo-Augmentative Communication Device-Breaking through the barriers-Dynamo":The New Standard in Digitized Speeh Devices; (4 pages).

* cited by examiner

COMMUNICATION DEVICE AND LEARNING TOOL

FIELD OF THE INVENTION

The present invention relates to an electronic communication device and learning tool for use by non-vocal individuals, or individuals having limited verbal communication skills.

BACKGROUND OF THE INVENTION

Aphasia is a condition in which an individual experiences an impairment or a loss of the ability to communicate by verbal speech or by writing, or has decreased ability to understand written or spoken language, due to a brain injury, illness or disease condition.

Many individuals afflicted by a brain injury, stroke, or other injury caused by external forces may suffer from aphasia. The partial or total inability to communicate through verbal speech or written language makes it difficult for professional caregivers and family members to ascertain the needs of the patient and to provide the appropriate care and assistance.

Depending upon the severity of the brain injury or disease, the ability of an individual to communicate to others may be at different levels. This is particularly important in a hospital setting or long-term care facility where there are many patients that are unable to verbally communicate with the health care providers and hospital staff, and many patients have different levels of verbal capability.

Another problem often encountered in a hospital setting relates to the treatment of patients who do not speak the language of the health care providers and hospital staff. The language barrier between the patient and the healthcare professional makes it difficult for the patient to communicate needs to the healthcare provider. Moreover, the language barrier makes it difficult for the healthcare provider to understand what the patient needs and to respond with the appropriate care.

A wide variety of augmentative and assistive communication devices have been developed for use by individuals having differing degrees of verbal communication skills.

A number of word and/or picture communication sheets, boards, and notebooks for use by individuals with limited verbal communication capabilities are commercially available from Interactive Therapeutics, Inc. (Stow, Ohio). A two-sided communication picture board is available under the trademark VISIBOARD. A four-sided picture communication board is commercially available from Interactive Therapeutics, Inc. under the trademark CRITICAL COMMUNICATOR, which includes basic care concepts and is intended to be used in a variety of patient care settings. However, none of the of the communication boards, sheets or notebooks generate a visually or audibly perceptible output in response to an input by the user.

A variety of augmentative communication devices are commercially available from Zygo Industries, Inc. (Portland, Oreg.). Hand-held, direct-selection, personal pen computer augmentative communication devices are commercially available from Zygo Industries, Inc. under the trademarks OPTIMIST and OPTIMIST II.

A number of portable, "text-to-speech" communication devices are also available from Zygo Industries, Inc. under the trademark LIGHTWRITER. The LIGHTWRITER communication devices include a keyboard and narrow display screen in the plane of the keyboard. For those individuals that do not have the motor capability to use a keyboard, scanning communication devices are also available. The LIGHTWRITER communication devices can be converted to scanning communication devices by connection a separate scanning module to the keyboard. The LIGHTWRITER communication devices, however, are limited to producing an output in response from an input received via the keyboard or by the scanning selection technique.

A foldable communication device including a keyboard, a display screen and a sound output means is available from Zygo Industries, Inc. under the trademark POLYANA II. Again, this device is limited to producing an output in response from an input received via the keyboard or by the scanning selection technique.

A number of augmentative communication devices are commercially available from Dynavox Systems, LLC (Pittsburgh, Pa.) under the trademarks DYNAVOX, DYNAMYTE and DYNAMO. These communication devices feature a dynamic touch screen display for activation by the user.

Nevertheless, there is still a need in the art for an easy to use, inexpensive, portable communication device that can be used by individuals with differing levels speech capability and motor skill capability, and for those individuals that speak only one language.

SUMMARY

The present invention, therefore, provides a communication and learning device comprising a first panel having opposite facing sides and carrying a plurality of indicia-bearing units on one of said opposite facing sides, a second panel having opposite facing sides, said second panel housing a display screen, a third panel having opposite facing sides and carrying a keyboard having a plurality of keys on one of the opposite facing sides, wherein said first, second and third panels are pivotably engaged to one another along one edge of each of said panels; and means for generating a perceptible output in response to an input from said indicia-bearing units.

In another embodiment, the present invention also provides a communication and learning device comprising a first panel having opposite facing sides and carrying a plurality of indicia-bearing units on one of said opposite facing sides, a second panel having opposite facing sides, said second panel housing a display screen on one of said opposite facing sides, a third panel having opposite facing sides and carrying a keyboard having a plurality of keys on one of the opposite facing sides, wherein said first, second and third panels are pivotably engaged to one another along one edge of each of said panels, means for generating a perceptible output in response to an input from the keys or indicia-bearing units, a processing means for processing input received from said keys of said keyboard; and memory means.

The present invention further provides a method of communicating comprising providing a communication and learning device comprising a first panel having opposite facing sides and carrying a plurality of indicia-bearing units on one of said opposite facing sides, a second panel having opposite facing sides and housing a display screen on one of the opposite facing surfaces, a third panel having opposite facing sides and carrying a keyboard having a plurality of keys on one of the opposite facing sides, wherein said first, second and third panels are pivotably attached to one another along one edge of said panels, and means for generating a perceptible signal in response from an input from the keys or indicia-bearing buttons; and contacting one of the keys or indicia-bearing buttons to produce an visually and/or audible perceptible output.

DETAILED DESCRIPTION OF THE PREFERRED EMBODIMENTS

The present invention relates to a communication device and learning tool having electronic circuitry for generating a visually perceptible signal and/or an audibly perceptible sound signal in response to an input by a user. In general, the device includes a plurality of depressible keys and indicia bearing units that are carried by hingedly engaged panels of the device. The device generates a visually perceptible output signal, an audibly perceptible output signal or both, in response to an input selectively received from either the indicia-bearing units or the keys of the keyboard. The user of the device depresses or touches indicia-bearing units or depressible keys that are carried by the panels of the communication device to activate the output signal generating means to produce a perceptible output.

Figure 1:
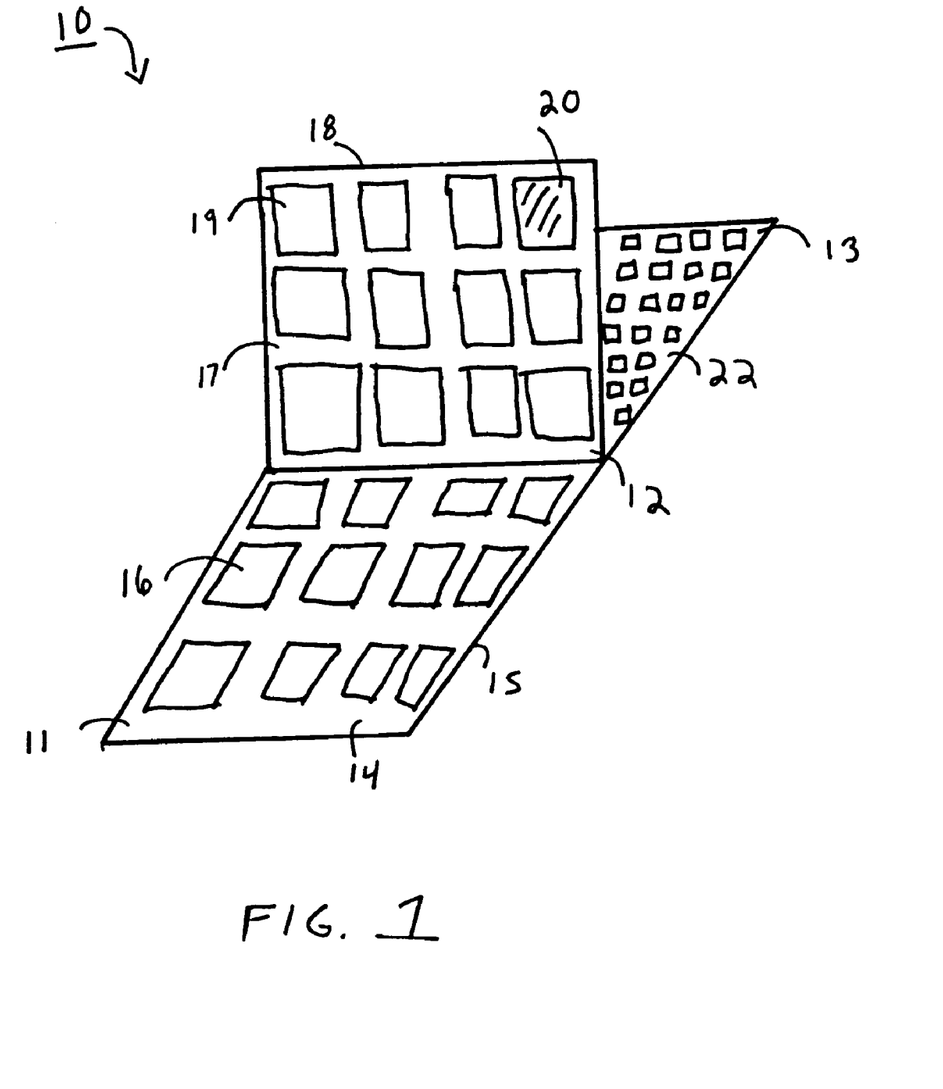
FIG. 1 is a perspective view of one embodiment of the of the communication device.
Figure 2:
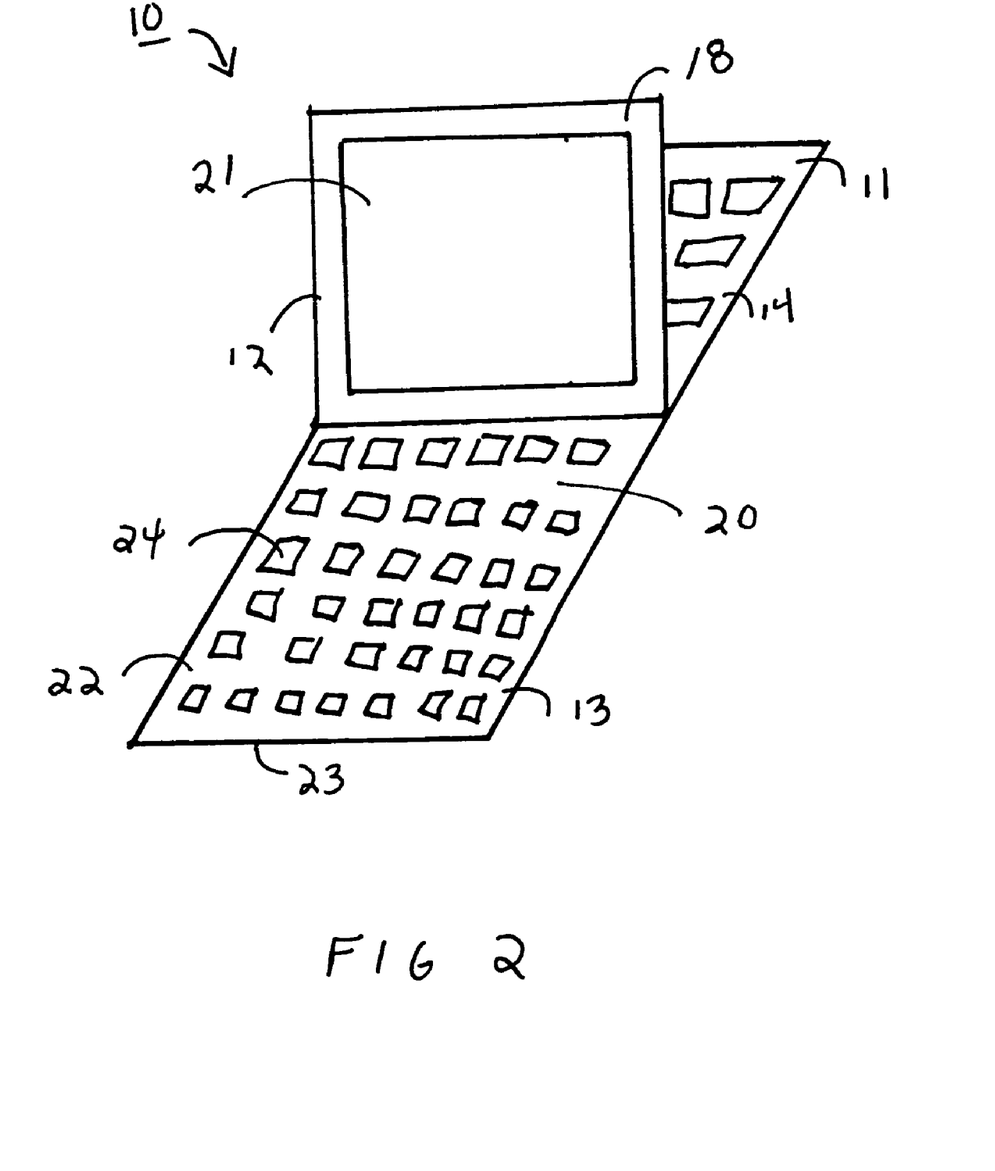
FIG. 2 is another perspective view of the embodiment of the communication device shown in FIG. 1.
Figure 3:
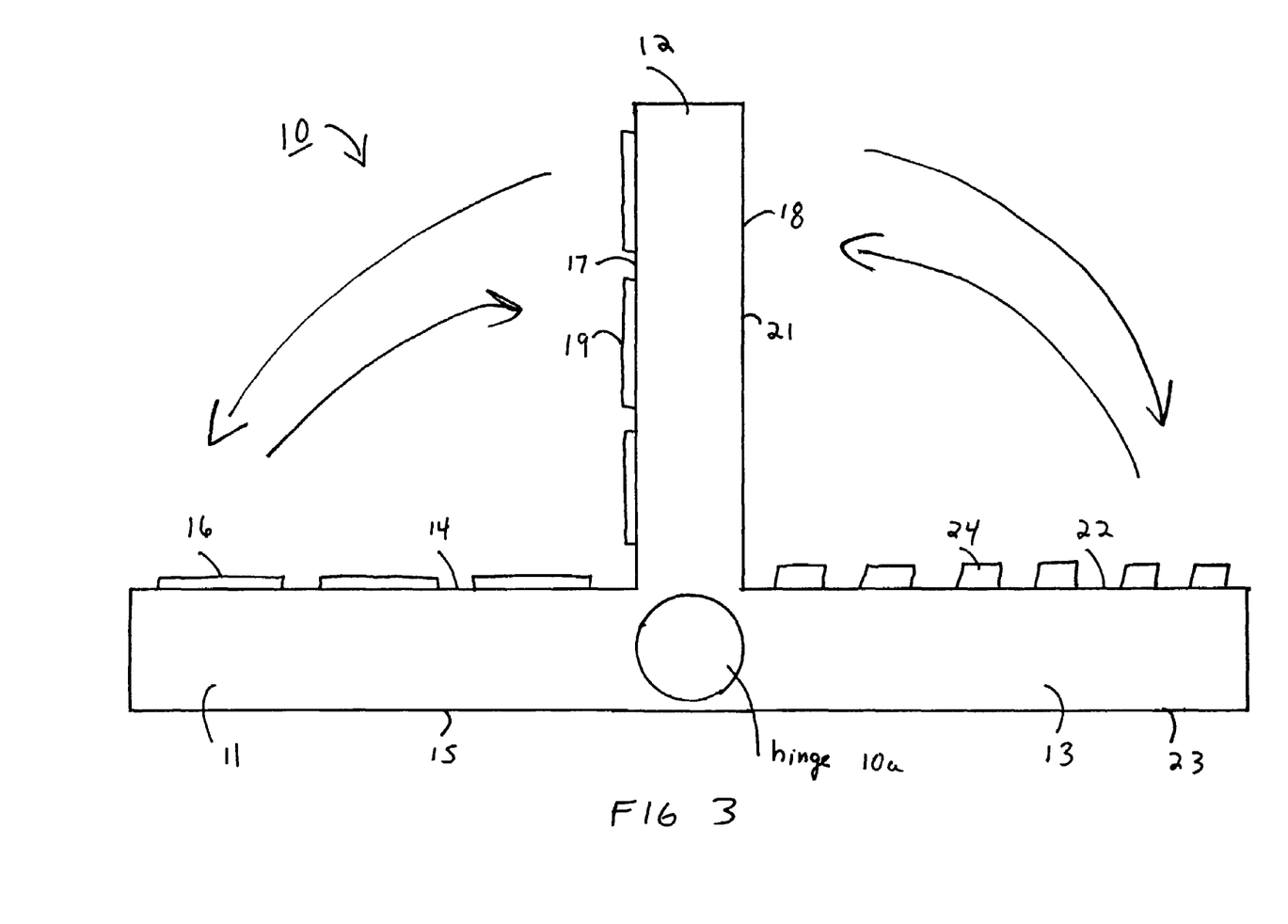
FIG. 3 is a side view of one embodiment of the communication device.
Figure 4:
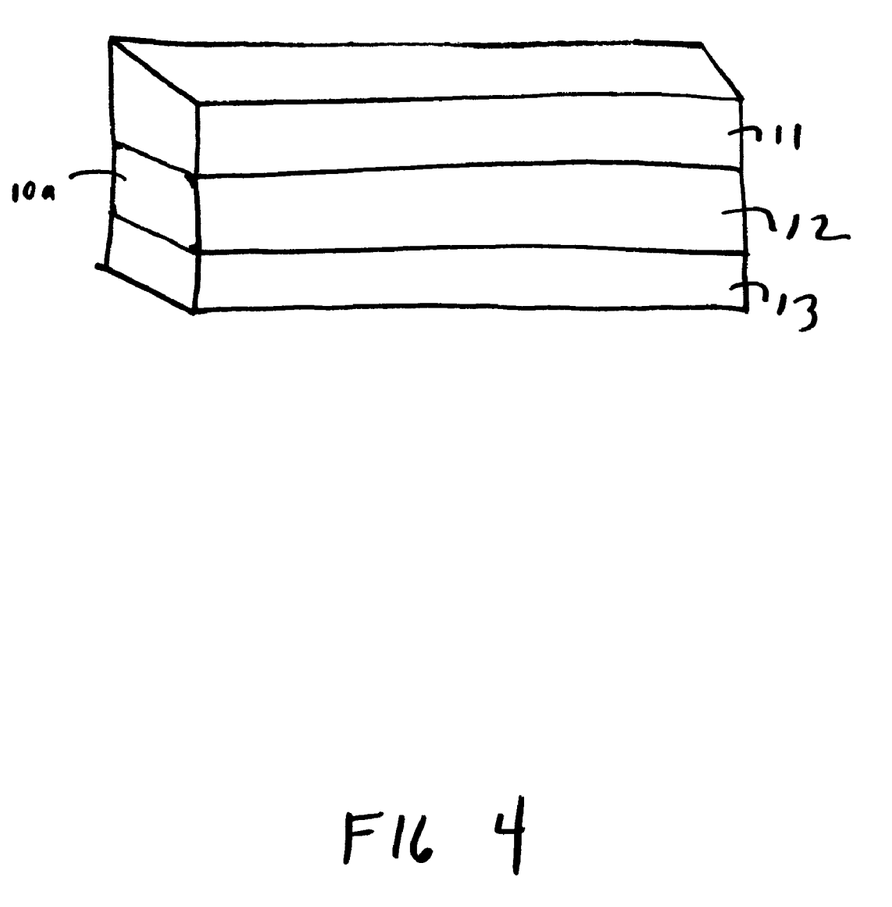
FIG. 4 is a side view of the communication device in the folded position.

Referring now to FIGS. 1-3, in one embodiment, the communication device 10 of the present invention includes a plurality of pivotably attached or engaged panels 11-13. Preferably, panels 11-13 of communication device 10 are hingedly engaged to one another by using hinge 10a. Panels 11-13 are hingedly engaged to another along one edge of each of panels 11-13. According to this construction, the communication device 10 can be opened and closed in substantially the same manner as a laptop or notebook computer.

Still referring to FIGS. 1-3, panel 11 of communication device 10 includes opposite facing sides or surfaces 14, 15. Opposite facing side 14 of panel 11 carries a plurality of indicia-bearing units 16.

Panel 12 of communication device 10 includes opposite facing sides 17, 18. Opposite facing side 17 of panel 12 may or may not include additional indicia-bearing units 19. However, in a preferred embodiment, opposite facing side 17 of panel 12 carries a plurality of indicia-bearing units 19. Opposite facing side 17 of panel 12 also includes a speaker 20 through which an audibly perceptible output, which is generated by activation of communication device by selectively receiving an input from one of the indicia-bearing units 16, 19, is emitted.

Panel 13 of communication device 10 includes opposite facing sides 22, 23. Opposite facing side 22 of panel 13 carriers, supports, or otherwise incorporates a keyboard having a plurality of depressible keys 24.

Opposite facing side 18 of panel 12 of communication device 10 incorporates or houses a display screen 21 for displaying an output that is generated in response to receiving an input from keys 24 of the carried by opposite facing side 22 of panel 13. The display screen 21 may comprise any type of screen that is capable of displaying an output that can be visually perceived. Preferably, the display screen 21 is a liquid crystal display screen or "LCD" screen.

The indicia-bearing units 16 of opposite facing side 14 of panel 11 of the communication device are carried or supported by opposite facing side 14 of panel 11. Likewise, the indicia-bearing units 19 of opposite facing side 17 of panel 12, if present, are carried or supported by opposite facing side 17 of panel 12. According to this embodiment, the indicia-bearing units 16, 19 are raised indicia-bearing buttons that are depressible to activate the output generating means to produce a desired perceptible output, thereby permitting the user of the device to communicate with another person. Each of the indicia bearing units 16, 19 is electronically connected to a visually or audibly perceptible output generating means. Housed beneath the indicia bearing units 16, 19 within panels 11, 12 is associated electronic circuitry to complete an electronic circuit to a visually and/or audibly perceptible output generating means. When the indicia-bearing units 16, 19 are in the undepressed state, the electronic circuit to the output generating means is open and no output is generated. When the user depresses any one of the indicia-bearing units 16, 19, the electronic circuit to the visually or audibly perceptible output generating means is closed and the visually or audibly perceptible output generating means is activated to produce a perceptible output signal. The indicia-bearing units 16, 19 bear indicia including, for example, at least one word and/or at least one graphic. In a certain embodiment, the indicia-bearing units bear a word and a graphic corresponding to the word.

According to one embodiment, the indicia-bearing units 16, 19 include a word in a first language and the corresponding word in a second language. According to this embodiment, the communication device 10 may be used as a simple translation device to translate a word or words from a first language to a second language. For example, but not in limitation, the indicia-bearing units 16, 19 include a word in the English language and a second word in the Spanish language, which corresponds to the English language word. Thus, the communication device 10 can be used as a bilingual communication device to translate a word or words from the English language into the Spanish language and vice versa. The communication device can be used by a Spanish-speaking individual to communicate to an individual that only speaks the English language. According to the embodiment shown in FIG. 5, the user depresses indicia-bearing button 16a if an sound output in the English language is desired to be generated. Conversely, an English-speaking individual may depress indicia-bearing button 16b, if an audible output in Spanish is desired. The user may easily and quickly switch from generating an output in one language to generating an output in a second language by switching depressing indicia-bearing units 16a, 16b. There are many Spanish-speaking individuals living in English-speaking countries, such as the United States. For example, the indicia-bearing buttons 16,19 may bear words that are frequently used in a healthcare setting, such as "yes," "no," "bath," "bathroom," "bed," "blanket," "chair," "drink,"

Figure 5:
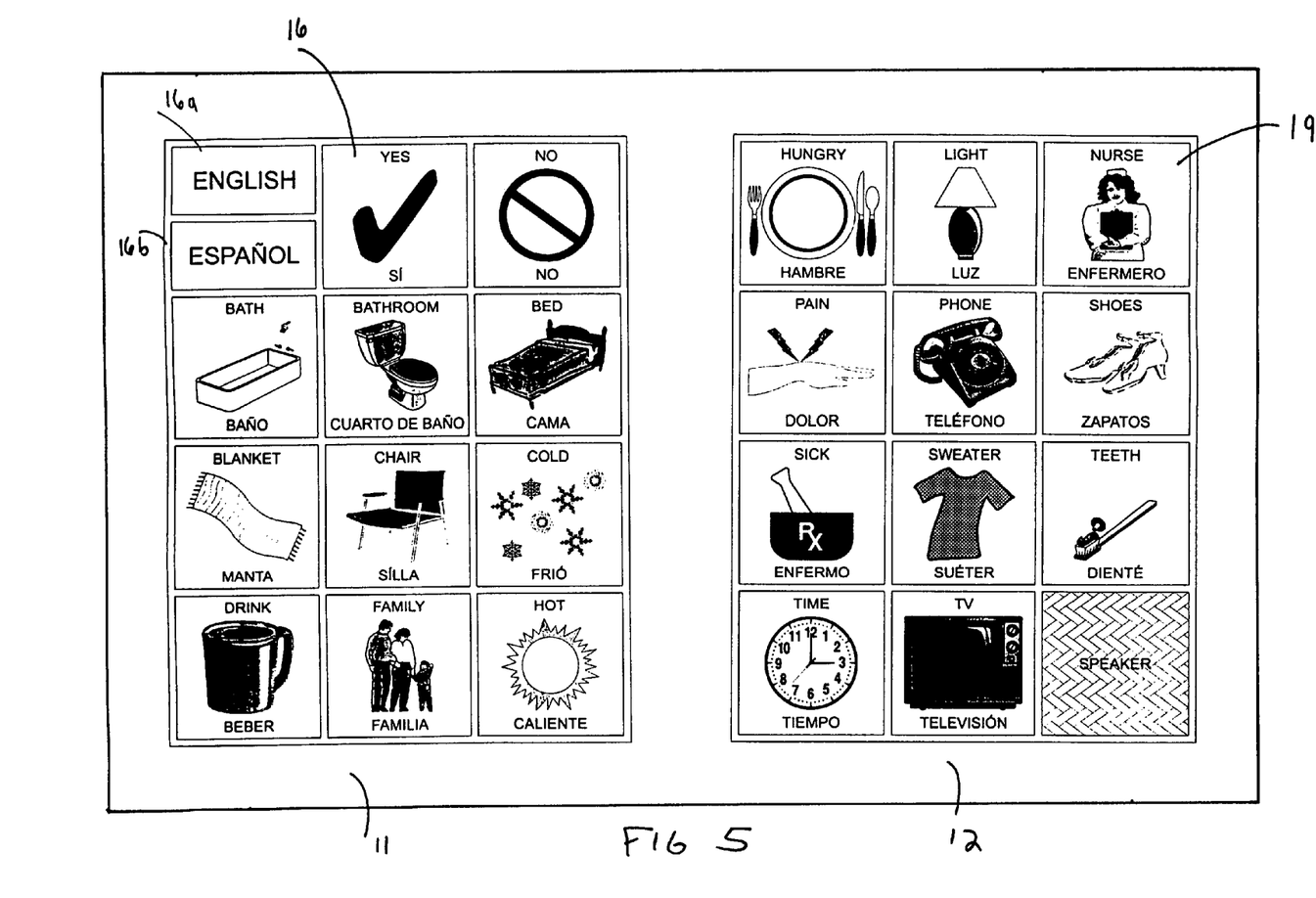
FIG. 5 is a plan view of one embodiment of the communication device showing indicia bearing members.

"family," "hungry," "light," "nurse," "pain," "phone," "shoes," "sick," "cold," "hot," "sweater," "teeth," and "time," and the corresponding Spanish words "sí," "no," "baño," "cuarto de baño," "cama," "manta," "silla," "beber," "familia," "hambre," "luz," "enfermera," "dolor," "telephono," "zapatos," "infermo," "caliente," "frío," "sueter," "diente," "tiempo," respectively. Thus, a user that is monolinguistic can use the communication device to communicate to another person that speaks a different language. The term "monolinguistic" is intended to refer to an individual that can only speak one language. In use, the user locates the indicia-bearing button 16, 19 that bears a word or phrase that the user recognizes as being in the language that the user speaks, and desires to communicate to another person. The user then depresses the selected indicia-bearing button to produce an output that can be perceived and understood by another person. Preferably, the indicia-bearing units 16, 19 are arranged on panels 11, 12 in alphabetical order, based on the words or words shown on the units in a first language. By way of illustration, the indicia-bearing units 16, 19 of panels 11, 12 are in alphabetical order, based on the English language.

The indicia-bearing units 16, 19 may include words, phrases and graphics that are commonly used in a patient care setting, such as in hospitals, rehabilitation facilities, long term care facilities, nursing homes and the like. However, this is only an illustrative example and the communication device can be tailored to many different environments, depending upon need. For example, the indicia-bearing buttons 16, 19 are easily removed from panels 11, 12 and can be replaced with indicia-bearing buttons bearing different words, phrases or graphics which can be tailored for use in different environments, such as schools and the workplace.

In another embodiment, the indicia-bearing units 16, 19 bear a word in a first language, a corresponding word in a second language and a graphic corresponding to both the word in a first language and the word in a second language.

As described above, the indicia-bearing buttons 16, 19 of panels 11 and 12 are associated or coupled with a means for generating a visually perceptible output, an audibly perceptible output or both. Disposed below each of the indicia-bearing buttons is electronic circuitry that is required to complete an electrical circuit to an output means, such as a light generating means or a sound synthesizer. The indicia-bearing members can be raised buttons that are easily depressible by the user to come into contact with conductive contact located below the indicia-bearing buttons and housed within panels 11, 12. In other embodiments, the indicia-bearing members 16, 19 of panels 11, 12 can be provided as touch sensitive pads that are disposed substantially in the plane of panels 11, 12. The touch sensitive pads can be prepared from a polymeric material, such as MYLAR™.

In one embodiment, the indicia-bearing members of panels 11, 12 of the communication and learning device 10 is coupled to a means for generating a visually perceptible output. According to this embodiment, the indicia-bearing buttons, when depressed, come into contact a conductive contact and close the electronic circuit to a means for producing a visually perceptible output. Preferably, the means for generating the visually perceptible output is a means for generating a source of visible light. Once activated by depressing a selected indicia-bearing unit, the electronic circuit to the visible light generating means is closed and the means generates a source of visible light that can be perceived by the naked eye. Preferably, the indicia-bearing units 16, 19 are manufactured from a material that is translucent. Preferably, the translucent material is manufactured from a rigid, resilient polymeric material. Accordingly, when a selected indicia-bearing unit is depressed by the user, the electronic circuit to the visible light generating means is closed. In this state, visibly perceptible light is emitted by the light generating and the depressed indicia-bearing unit "lights up."

In another embodiment, the indicia-bearing units 16, 19 of panels 11, 12 of the communication and learning device 10 is coupled to a means for generating an audibly perceptible output. According to this embodiment, the indicia-bearing buttons, when depressed, to come into contact a conductive contact and close the electronic circuit to a means for producing an audibly perceptible output. Preferably, the audibly perceptible output is generated by a sound synthesizer. The sound synthesizer is in turn coupled to a speaker from which the synthesized or generated sound is emitted. In another embodiment, the sound synthesizer may also be coupled to a sound amplifier to amplify the generated sound output before it is emitted through the speaker. The sound synthesizer electronics includes the hardware and software for generating and storing synthesized sounds.

According to still another embodiment, the indicia-bearing members of panels 11 and 12 of the communication and learning device is coupled to a means for generating a visually perceptible output and an audibly perceptible output. According to this embodiment, the indicia-bearing buttons, when depressed, come into contact with conductive contacts and close the electronic circuit to means for producing a visually perceptible output and a means for producing an audibly perceptible signal, or both types of signals.

The communication device 10 further includes panel 13 that carries or supports a keyboard 20. Panel 13 is hingedly attached, along one side of the panel, to panels 11, 12 of the communication device 10 to produce a foldable communication device. In one embodiment, the keyboard includes a plurality of keys 24 that are disposed on the keyboard in a format that is typically utilized for computer keyboards.

The communication device is capable of receiving an input from the keys of the keyboard of panel 13, processing the input and presenting an output of the processed input. The input means of the communication device refers to that part of the computer transfers or otherwise introduces input into the communication device. The communication device also includes a processing unit or "processor" for processing input and memory means for storing input and processed input. The processor of the device refers to the part of the device that interprets and executes the input that has been transferred from the input means. The memory means is that part of the communication device that is used for storing data. The processor and memory means is housed with panel 13 of communication device 10. The output of communication device is the results of the processing of the input that has been introduced into the communication. An output means is any device is that part of the communication device that communicates the resulting of processing (ie—the output) to the user, or which otherwise presents or displays the output.

Figure 6:
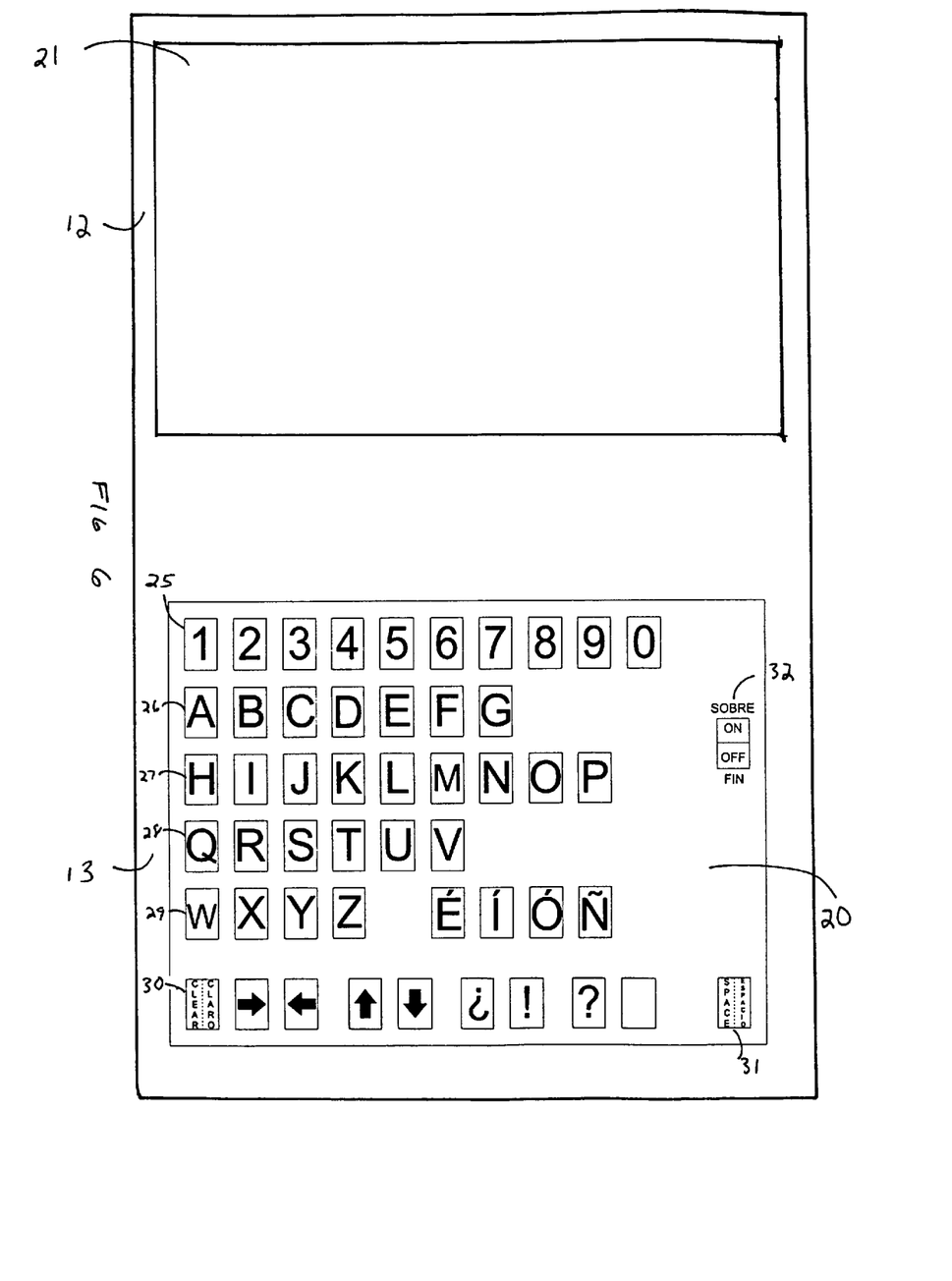
FIG. 6 is a plan view the communication device of showing the display screen and keyboard.

Now referring to FIG. 6, in another embodiment, the keys of the keyboard 24 are arranged in an "easy find" format. According to this embodiment, the keys of the keyboard 24 include numerals that are arranged in ascending numerical order. The keys of keyboard 24 also include letters of a predetermined alphabet, and which are arranged in alphabetical order. According to one preferred embodiment, the keys of the keyboard include letters of the English language and are arranged in alphabetical order using six rows of keys. The first row 25 of the keyboard 24 includes keys for the numerals 0-9. The keys for the numerals 1-9 are arranged in ascending numerical order, with the key for the numeral 0 following the key for the numeral 9. The second row 26 of the keyboard 24 includes alphabet letter keys for the letters A-G of the English alphabet. The third row of keys 27 of keyboard 24 includes keys for letters H-P of the English alphabet. The fourth row of keys 28 of the keyboard includes keys for letters Q-V of the English alphabet. The fifth row of keys 29 of the keyboard 24 includes keys for the letters W-Z of the English language. According the illustrative embodiment shown, the fifth row of keys 29 of the keyboard 24 may also include specialized keys for letters of a second language. As shown in FIG. 6, the keyboard includes keys bearing accented letters of a second language, namely, the Spanish language. Additional keys or rows of keys may also be provided on the keyboard 24 for command functions, punctuation marks, for powering the device, for directing the cursor, and the like. Keyboard 20 of panel 13 includes key 30 to clear out an erroneous input by the user. Key 31 is another command key for providing a space between letters or words that are keyed into the communication device. Key 32 is depressed to provided power to the communication device of the present invention.

The keys of the keyboard 24 are the input means of panel 13 of the communication device and permits the user to type in words, phrases or sentences for communication with others. According to the present invention, the user may type a desired word, words, phrase or complete sentence into the communication device 10 by depressing the keys of the keyboard 24 carried by panel 13. As the user depresses the appropriate keys of the keyboard, letters, words, phrases or sentences will be displayed on the display screen 21 of panel 13, and can be easily viewed by the person to which the user is trying to communicate. Thus, the non-vocal user of the communication device can effectively communicate a desired thought to another person.

While the above illustrative embodiment of FIG. 6 has been utilized to describe the keyboard 24 of the communication device 10 in greater detail, there is no limitation on the arrangement of the keys on the keyboard 24.

In another embodiment, an audibly perceptible signal can be generated through an input received from the keys of the keyboard 13 of the communication device 10. According to this embodiment, the user inputs letters, words, phrase or sentences by depressing the keys of the keyboard. The input is received by the communication device 10 and is processed by the processor. The processor is interfaced with an audibly perceptible signal generating means, such as a sound synthesizer.

The communication device of the present invention includes a number of pivotably connected panels that are conveniently foldable or collapsible.

The overall dimensions of the communication device are not critical. Nevertheless, for ease of carrying and storing, the communication device can be conveniently folded to the dimensions of nine inches in length by seven inches in width by two inches height. The communication device may include integral or detachable handles or straps for carrying the device.

The communication device of the present invention provides numerous benefits to those individuals in need of communication assistance. For example, the communication device requires little skill to operate by the user, health care provider or home care giver.

The communication device 10 is an electronic device that is capable of functioning from either a power source of alternating current (AC) or direct current (DC). For example, communication device may function from a direct current power source, such as a battery. The battery can include disposable batteries and rechargeable batteries. Preferably, the direct current battery is a rechargeable battery. By way of illustration, the rechargeable battery is a lithium cell battery. The communication device 10 may also function from an internal or external source of alternating current.

The electronic circuitry housed in panels 11, 12 for producing the visually perceptible or audibly perceptible output in response from an input from the indicia-bearing units 16, 19 is electrically connected or otherwise coupled to a power source for powering the device. Preferably, the electronic circuitry for producing an output in response to receiving an input by depressing the indicia-bearing units 16, 19 is connected to a source of direct current power, such as a rechargeable battery. To provide the device with power to "power up" the user simply depresses buttons 16a or 16b to complete an electronic circuit to the power source. Once the device is powered up, depression of the indicia-bearing units 16, 19 will result in the generation of a visually or audibly perceptible output. When the indicia-bearing units 16, 19 are not being depressed by a user, the device to a "sleep-mode" in which very minimal power is drawn from the direct current power source.

The invention also includes a method of using the communication device and learning tool. The method includes providing a communication and learning device that comprises a panel having opposite facing surfaces and supporting a keyboard having a plurality of depressible keys on one of the opposite face surfaces, a panel having opposite facing surfaces and supporting a display screen on one of the opposite facing surfaces, and a panel having opposite facing surfaces and supporting a plurality of depressible indicia-bearing buttons. The panels of the communication device are hingedly attached to one another to provide for a foldable unit that can be easily carried by the user or conveniently stored in small spaces. The communication device includes a processing means for processing input that is selectively introduced to the communication device by the user. The user inputs a command via the keys of the keyboard or via the indicia-bearing members. Memory means is provided for storing data that is inputed into the device, or that is processed by the device. The device also include means for generating a perceptible output in response to an input from the keys or indicia-bearing buttons. The keys of the keyboard and/or indicia-bearing buttons are depressed to produce an visually and/or audible perceptible output.

Figure 7:
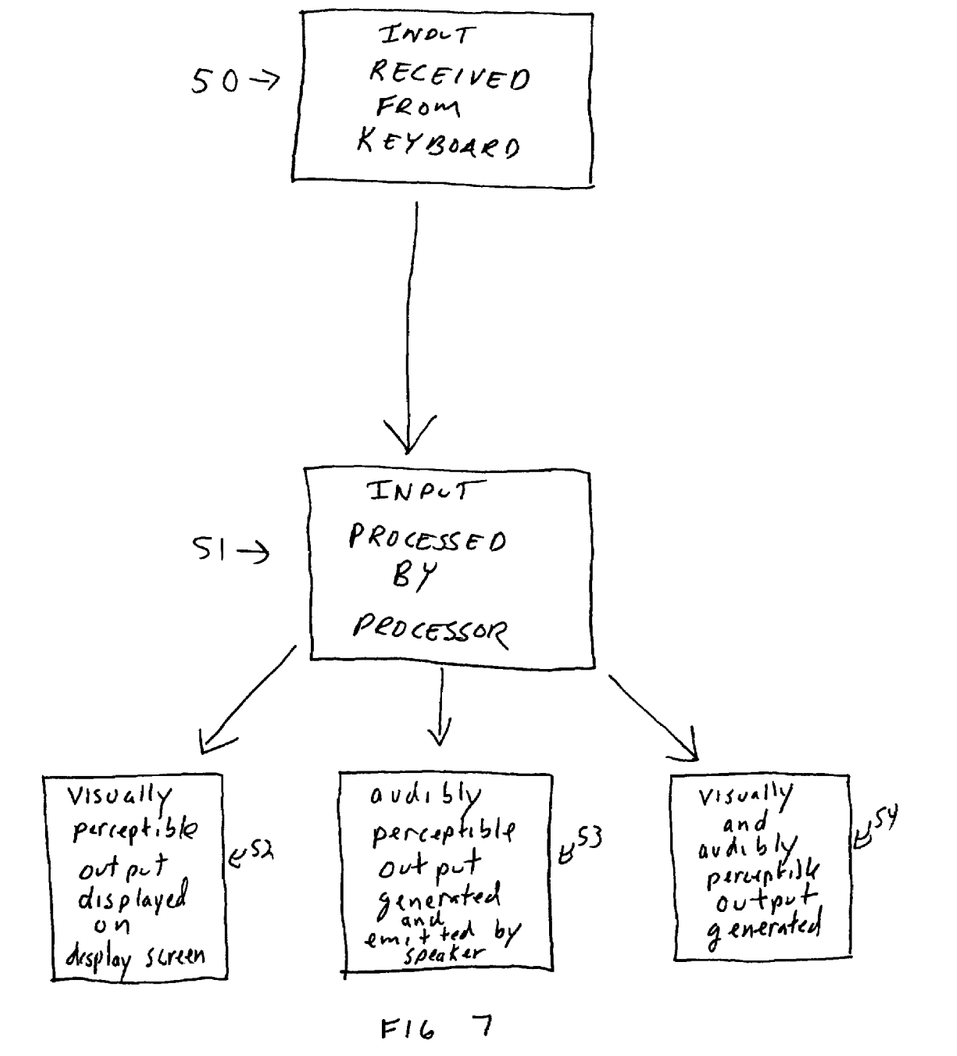
FIG. 7 is a flow diagram for generating an perceptible output from input from the keys of the keyboard panel of the device.

Referring to FIG. 7, input 50 is received by the user depressing the keys 24 of panel 13 of the communication device. Input 50 is processed by processor 51 that is housed within panel 13 of the communication device 10. Input 50 may be processed into a visually perceptible output 52. In another embodiment, input 50 can be processed by processor 51 into an audibly perceptible output 53 that can be emitted by speaker 20 of panel 12. Input 50 may also be processed by processor into a visually and audibly perceptible output 54 that is simultaneously generated.

Figure 8:
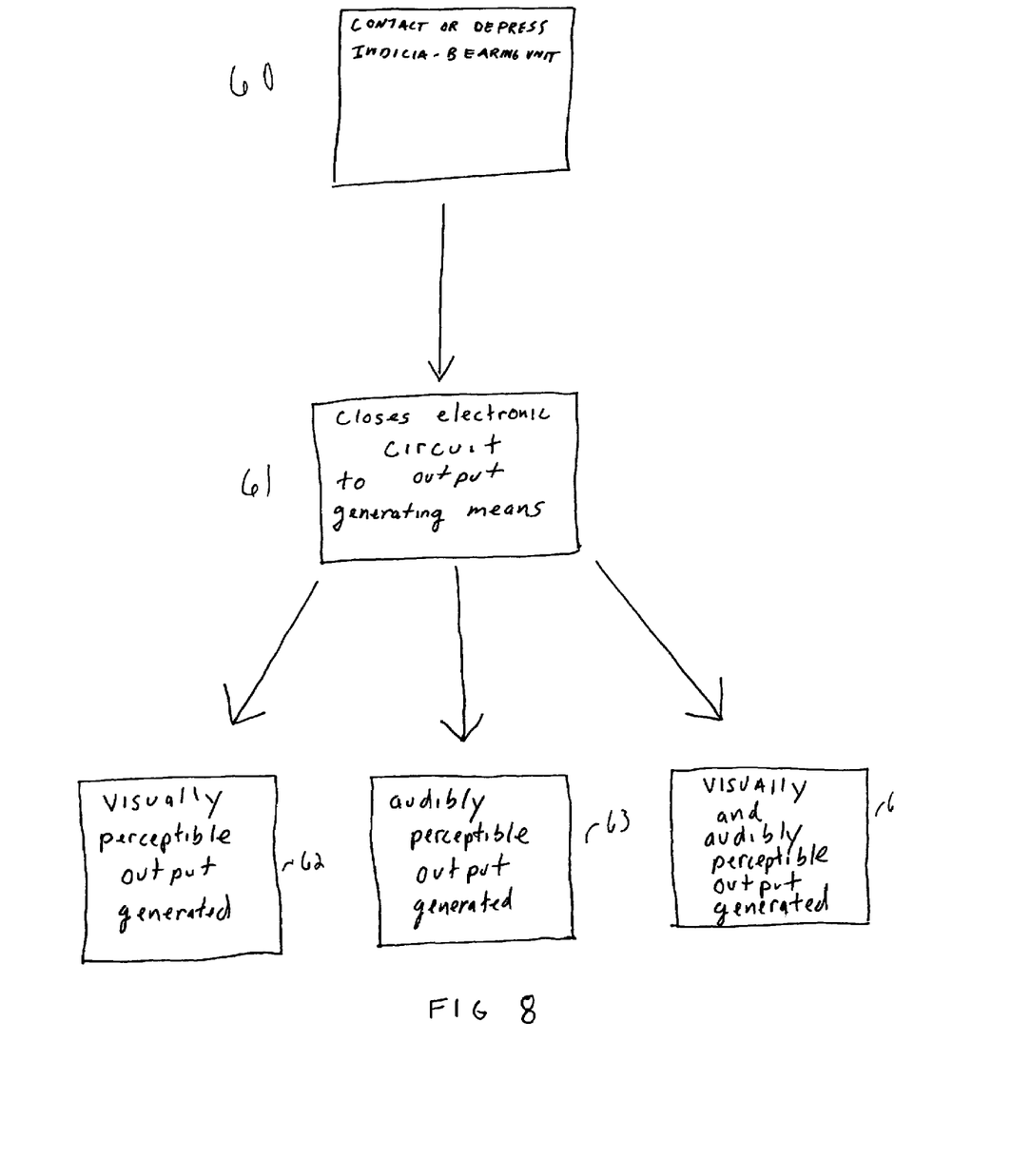
FIG. 8 is a flow diagram for generating an perceptible output from input from the indicia-bearing units of the device.

Referring to FIG. 8, input 60 is received by the user contacting or depressing the indicia-bearing units 16, 19 of panels 11, 12 of the communication device. BY depressing the indicia-bearing units, the electronic circuit 61 to the output generating means is closed. A visually perceptible output 62 may be generated when the circuit is electronic circuit is closed. In another embodiment, an audibly perceptible output 63 can be generated that can be emitted by speaker 20. A visually and audibly perceptible output 64 can be generated when the electronic circuit is closed.

Based on the foregoing disclosure, the present invention provides a novel electronic communication device and learning tool. The present invention is not limited to the preferred embodiments described above, but includes variations, modifications and equivalent embodiments defined by the following claims.

We claim:

1. A communication and learning device comprising:
   a first panel having opposite facing sides and carrying a plurality of indicia-bearing units on one of said opposite facing sides;
   a second panel having opposite facing sides, said second panel housing a display screen on one opposite facing side;
   a third panel having opposite facing sides and carrying a keyboard having a plurality of keys on one of the opposite facing sides;
   wherein said first, second and third panels are pivotably engaged to one another along a common edge of said device; and
   means for generating a perceptible output in response to an input from said indicia-bearing units.

2. The communication and learning device of claim 1, wherein said side of said second panel opposite of said side housing said display screen carries a plurality of indicia-bearing units.

3. The communication and learning device of claim 2, wherein the indicia-bearing units are raised, depressible buttons.

4. The communication and learning device of claim 2, wherein each of said indicia-bearing units are in electronic connection with said perceptible output generating means.

5. The communication and learning device of claim 4, wherein the perceptible output generating means is selected from the group consisting of an audibly perceptible output generating means, visually perceptible output generating means or both.

6. The communication and learning device of claim 5, wherein said visually perceptible output generating means is a source of visible light.

7. The communication and learning device of claim 5, wherein said audibly perceptible output generating means is a sound synthesizer.

8. The communication and learning device of claim 7, wherein said sound synthesizer is electronically connected to a speaker and, optionally, to a sound amplifier.

9. The communication and learning device of claim 5, wherein each of said indicia-bearing units are electronically connected to an audibly perceptible output generating means and to a visually perceptible output generating means.

10. The communication and learning device of claim 2, wherein at least one of said indicia-bearing units includes indicia thereon selected from the group consisting of a word and a graphic.

11. The communication and learning device of claim 10, wherein at least one of said indicia-bearing units includes a word and a graphic corresponding to the word thereon.

12. The communication and learning device of claim 10, wherein at least one of said indicia-bearing units includes a word in a first language and the corresponding word in a second language.

13. The communication and learning device of claim 12, wherein the language of the first and second languages are different and are selected from the group consisting of English, Spanish, German, French, Italian, Hungarian, Croation, Chinese, Japanese, and Korean.

14. The communication and learning device of claim 13, wherein the first language is English and the second language is Spanish.

15. The communication and learning device of claim 10, wherein at least one indicia-bearing units includes a word in a first language, a corresponding word in a second language and a graphic corresponding to both the word in a first language and the word in a second language.

16. The communication and learning device of claim 1, wherein said keys of said keyboard bear a letter of an alphabet, a numeral, a punctuation mark or a command.

17. The communication and learning device of claim 2, wherein said keys of said keyboard bear a letter of an alphabet, a numeral, a punctuation mark, or a command.

18. The communication and learning device of claim 1, further comprising a power supply to provide power to said device.

19. A communication and learning device comprising:
   a first panel having opposite facing sides and carrying a plurality of indicia-bearing units on one of said opposite facing sides;
   a second panel having opposite facing sides, said second panel housing a display screen on one of said opposite facing sides;
   a third panel having opposite facing sides and carrying a keyboard having a plurality of keys on one of the opposite facing sides;
   wherein said first, second and third panels are pivotably engaged to one another along a common edge of said device;
   means for generating a perceptible output in response to an input from the keys or indicia-bearing units;
   a processing means for processing input received from said keys of said keyboard; and
   memory means.

20. The communication and learning device of claim 19, wherein said side of said second panel opposite of said side housing said display screen carries a plurality of indicia-bearing units.

21. The communication and learning device of claim 20, wherein the indicia-bearing units are raised, depressible buttons.

22. The communication and learning device of claim 20, wherein each of said indicia-bearing units are in electronic connection with said perceptible output generating means.

23. The communication and learning device of claim 22, wherein said perceptible output generating means is selected from the group consisting of audibly perceptible output generating means, visually perceptible output generating means or both.

24. The communication and learning device of claim 23, wherein said visually perceptible output generating means is a source of visible light.

25. The communication and learning device of claim 23, wherein the audibly perceptible output generating means is a sound synthesizer.

26. The communication and learning device of claim 25, wherein said sound synthesizer is electronically connected to a speaker and, optionally, to a sound amplifier.

27. The communication and learning device of claim 23, wherein each of said indicia-bearing units are electronically connected to audibly perceptible signal generating means and to visually perceptible signal generating means.

28. The communication and learning device of claim 20, wherein at least one of said indicia-bearing units includes indicia thereon selected from the group consisting of a word and a graphic.

29. The communication and learning device of claim 28, wherein at least one of said indicia-bearing units includes a word and a graphic corresponding to the word thereon.

30. The communication and learning device of claim 28, wherein at least one of said indicia-bearing units includes a word in a first language and the corresponding word in a second language.

31. The communication and learning device of claim 30, wherein the language of the first and second languages are different and are selected from the group consisting of English, Spanish, German, French, Italian, Hungarian, Croation, Chinese, Japanese, and Korean.

32. The communication and learning device of claim 31, wherein the first language is English and the second language is Spanish.

33. The communication and learning device of claim 28, wherein at least one indicia-bearing unit includes a word in a first language, a corresponding word in a second language and a graphic corresponding to both the word in a first language and the word in a second language.

34. The communication and learning device of claim 19, wherein said keys of said keyboard bear a letter of an alphabet, a numeral, a punctuation mark or a command.

35. The communication and learning device of claim 20, wherein said keys of said keyboard bear a letter of an alphabet, a numeral, a punctuation mark, or a command.

36. The communication and learning device of claim 19, further comprising a power supply to provide power to said device.

* * * * *